US012623572B2

(12) United States Patent
Jeong et al.

(10) Patent No.: US 12,623,572 B2
(45) Date of Patent: May 12, 2026

(54) DRIVER'S SEAT MOUNTING STRUCTURE OF VEHICLE

(71) Applicants:Hyundai Motor Company, Seoul (KR); Kia Corporation, Seoul (KR)

(72) Inventors: Seung Min Jeong, Hwaseong-si (KR); Guk Mu Park, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 388 days.

(21) Appl. No.: 18/360,040

(22) Filed: Jul. 27, 2023

(65) Prior Publication Data

US 2024/0336164 A1      Oct. 10, 2024

(30) Foreign Application Priority Data

Apr. 10, 2023    (KR) ......................... 10-2023-0046882

(51) Int. Cl.
*B60N 2/005*          (2006.01)
*B60R 16/04*          (2006.01)
(52) U.S. Cl.
CPC ............. *B60N 2/005* (2013.01); *B60R 16/04* (2013.01)
(58) Field of Classification Search
CPC ...................................................... B60N 2/005
See application file for complete search history.

(56) References Cited

U.S. PATENT DOCUMENTS

| | | | | | |
|---|---|---|---|---|---|
| 291,383 | A | * | 1/1884 | Moore ................. | B60N 2/3095 296/63 |
| 1,755,935 | A | * | 4/1930 | Roberts ................. | B60N 2/005 70/261 |
| 6,095,271 | A | * | 8/2000 | Dickie .................... | B60R 16/04 180/68.5 |
| 8,973,982 | B2 | | 3/2015 | Tabuteau et al. | |
| 10,486,515 | B2 | * | 11/2019 | Saeki ...................... | B60N 2/005 |
| 11,351,890 | B2 | * | 6/2022 | Park ....................... | B60N 2/015 |
| 2006/0273610 | A1 | * | 12/2006 | Kobayashi ............. | B60N 2/015 296/63 |

(Continued)

FOREIGN PATENT DOCUMENTS

| | | |
|---|---|---|
| JP | 2010173487 A | 8/2010 |
| JP | 2016068781 A | 5/2016 |
| JP | 2018192948 A | 12/2018 |

(Continued)

OTHER PUBLICATIONS

Yasuhiro, Hara, Battery-Mounting Structure for Vehicle, Oct. 26, 2017, JP2017193299. (Year: 2017).*

*Primary Examiner* — Jonathan Malikasim
(74) *Attorney, Agent, or Firm* — Slater Matsil, LLP

(57) ABSTRACT

An embodiment seat mounting structure for a vehicle includes a seat mounting support designed to protrude from an upper side of a floor panel, a seat leg bracket provided on a lower side of a seat and coupled to an upper side of the seat mounting support to fix the seat to the upper side of the seat mounting support, a seat cross member to be provided on a lower side of the floor panel to face the seat mounting support with the floor panel therebetween and arranged long in a transverse direction of a vehicle body, and a battery passing bolt configured to pass through a battery pack disposed under the floor panel and the seat cross member to be coupled to the seat cross member.

20 Claims, 8 Drawing Sheets

(56)                    References Cited

U.S. PATENT DOCUMENTS

2021/0331749  A1     10/2021   Hwang et al.
2021/0387550  A1 *   12/2021   Lee .................... B62D 25/2036

FOREIGN PATENT DOCUMENTS

JP          2021030906  A      3/2021
KR           102299332  B1     9/2021
KR          20210130883  A     11/2021

* cited by examiner

DRIVER'S SEAT MOUNTING STRUCTURE OF VEHICLE

CROSS-REFERENCE TO RELATED APPLICATIONS

This application claims the benefit of Korean Patent Application No. 10-2023-0046882, filed on Apr. 10, 2023, which application is hereby incorporated herein by reference.

TECHNICAL FIELD

The present disclosure relates to a technology for mounting a driver's seat of a vehicle on a vehicle body.

BACKGROUND

A purpose built vehicle (PBV) includes a life module that forms various types of boarding and loading spaces according to market needs and a drive module that is related to the substantial driving of the vehicle. Thus, life modules according to various needs may be coupled to a certain drive module, thus allowing various types of vehicles to be easily produced. Consequently, it is possible to very effectively respond to a market flow by small quantity batch production.

In the case of an electric vehicle-based PBV for maximizing the size of an interior space, it is preferable that a driver's seat is arranged to be biased toward the front of the vehicle, thus increasing the utilization of a rear living space for a passenger and a loading box.

When the driver's seat is arranged to be biased toward the front of the vehicle, it is preferable that a power train required for driving the vehicle is disposed under the driver's seat, and the driver's seat is disposed thereabove. In this case, since the driver's seat is located at a very high location above a floor of a vehicle body, it is very important to secure NVH performance and durability of a portion on the floor supporting the driver's seat.

The description provided above as a related art of embodiments of the present disclosure is helping understand the background of embodiments of the present disclosure and should not be construed as being included in the related art known by those skilled in the art.

SUMMARY

An embodiment of the present disclosure provides a driver's seat mounting structure of a vehicle that arranges a driver's seat to be biased towards the front of the vehicle, thus maximizing interior space utilization of the vehicle, securing a comfortable foot accommodation space for a driver, guaranteeing a stable and firm support state for the driver's seat, ensuring the durability of the driver's seat, and reducing vibration and noise, thereby ultimately improving the marketability of the vehicle.

According to an embodiment of the present disclosure, there is provided a driver's seat mounting structure of a vehicle, the structure including a seat mounting support installed to protrude from an upper side of a floor panel, a seat leg bracket provided on a lower side of a seat and coupled to an upper side of the seat mounting support to fix the seat to the upper side of the seat mounting support, a seat cross member provided on a lower side of the floor panel to face the seat mounting support with the floor panel therebetween and arranged long in a transverse direction of a vehicle body, and a battery passing bolt passing through a battery pack disposed under the floor panel and the seat cross member to be coupled to the seat cross member.

The seat mounting support may be formed long in a front-rear direction of the vehicle body, a seat mounting reinforcement may be provided on each of front and rear sides of the seat mounting support to reinforce rigidity of the seat mounting support, and the seat cross member may include a front seat cross member installed on a lower side of the seat mounting reinforcement provided on the front side of the seat mounting support and a rear seat cross member installed on a lower side of the seat mounting reinforcement provided on the rear side of the seat mounting support.

A seat mounting gusset may be provided above a portion to which the battery passing bolt is coupled, thus defining a space extending long in a vertical direction together with the seat mounting support and the seat mounting reinforcement.

The space may be formed in a shape of a rectangular pillar by the seat mounting support, the seat mounting reinforcement, and the seat mounting gusset.

A seat mounting foot bracket may be installed on the lower side of each of the seat mounting support, the seat mounting reinforcement, and the seat mounting gusset defining the space, and the seat mounting foot bracket may be provided to face the seat cross member with the floor panel therebetween.

The seat mounting foot bracket may be coupled to and be in surface contact with a lower end of an inside of the seat mounting support, a lower end of an inside of the seat mounting reinforcement, and a lower end of the seat mounting gusset.

The battery passing bolt may be fastened to a weld nut provided on the seat cross member.

The battery passing bolt may be fastened to a weld nut provided on a battery mounting bracket that is further provided on the lower side of the seat cross member.

The seat cross member may have a W-shaped cross-section, the battery mounting bracket may be formed in a shape of a panel surrounding the lower side of the seat cross member, the weld nut may be coupled to the upper side of the battery mounting bracket within a central recess of the seat cross member, and the battery passing bolt may pass through the battery mounting bracket and then may be fastened to the weld nut.

The seat mounting support may be formed long in a front-rear direction, may be disposed to support a lower portion of either side of the seat, and may form a rectangular lattice structure together with the front seat cross member and the rear seat cross member with the floor panel therebetween.

A seat mounting bracket to which the seat leg bracket is coupled may be provided on the upper side of the seat mounting reinforcement that is provided on the front side of the seat mounting support while surrounding a corner where the seat mounting support and the seat mounting reinforcement meet each other.

According to embodiments of the present disclosure, a driver's seat is arranged to be biased towards the front of the vehicle, thus maximizing interior space utilization of the vehicle, securing a comfortable foot accommodation space for a driver, guaranteeing a stable and firm support state for the driver's seat, ensuring the durability of the driver's seat, and reducing vibration and noise, thereby ultimately improving the marketability of the vehicle.

DETAILED DESCRIPTION OF ILLUSTRATIVE EMBODIMENTS

Figure 1:
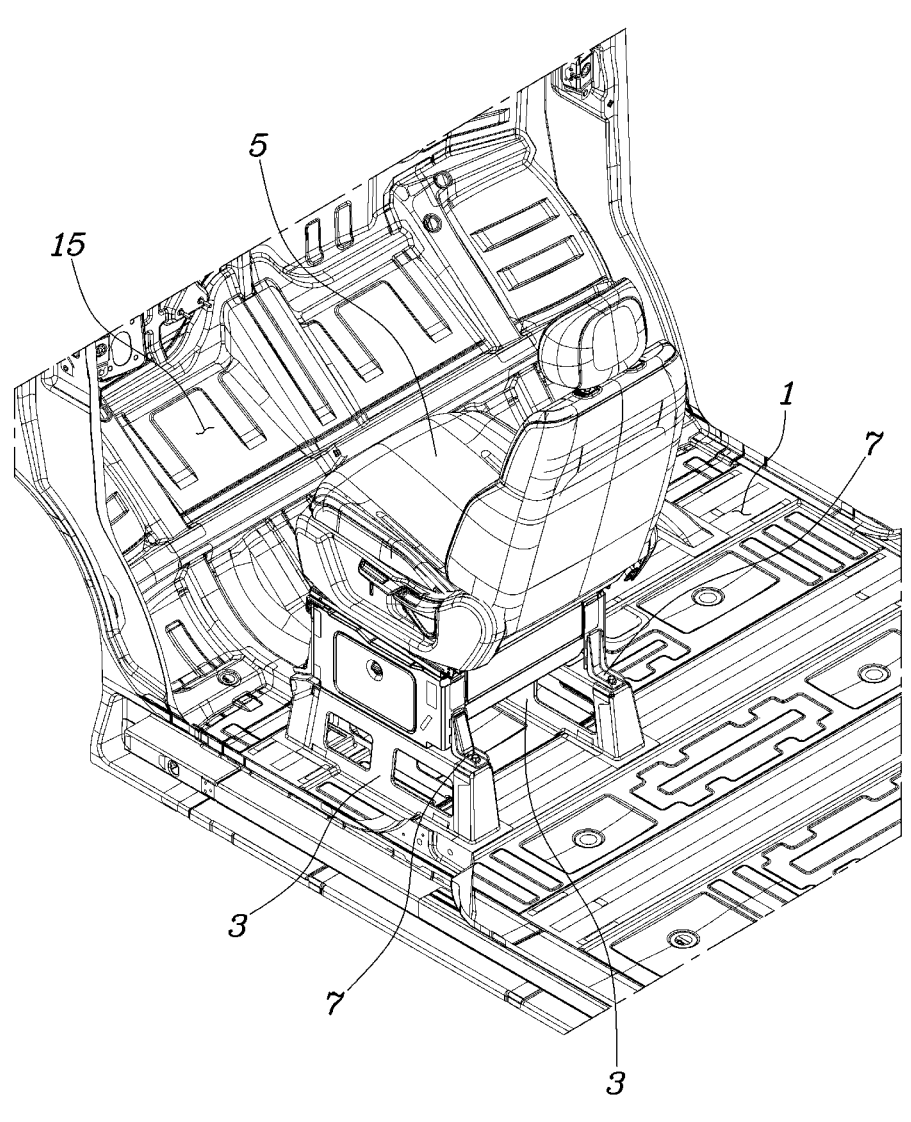
FIG. 1 is a view showing a driver's seat mounting structure of a vehicle according to embodiments of the present disclosure.
Figure 2:
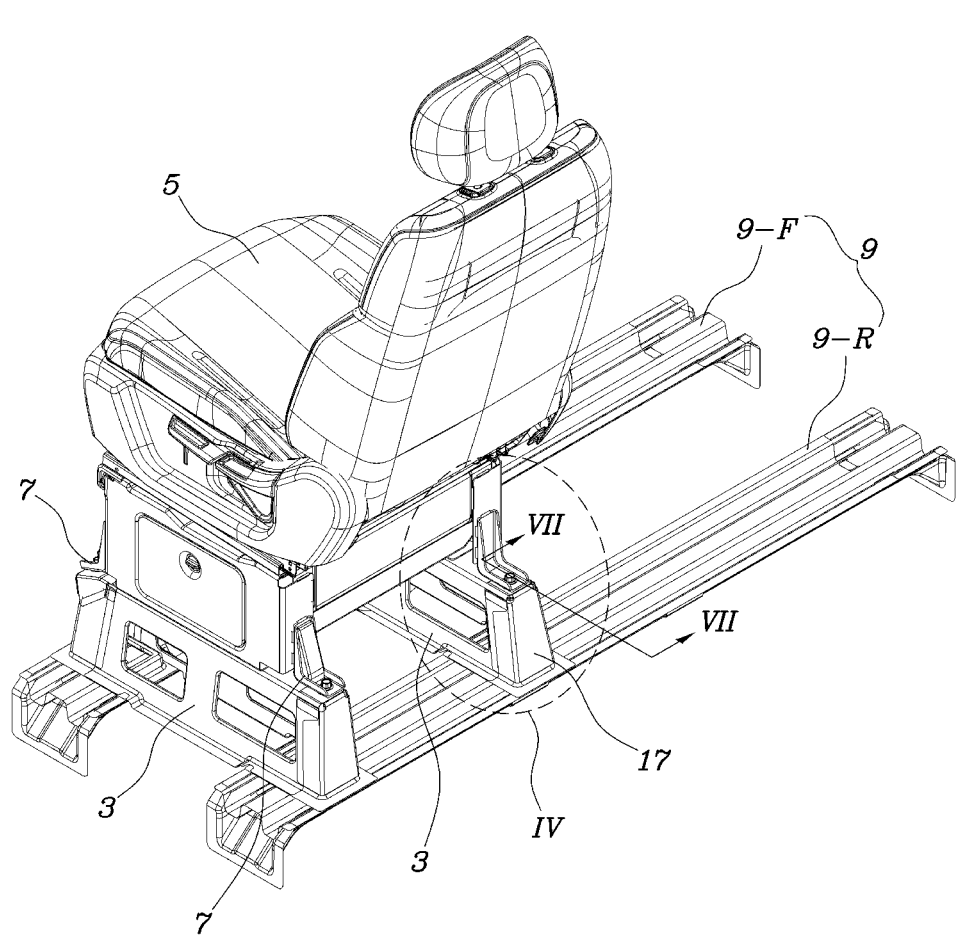
FIG. 2 is a view showing certain components of FIG. 1.
Figure 3:
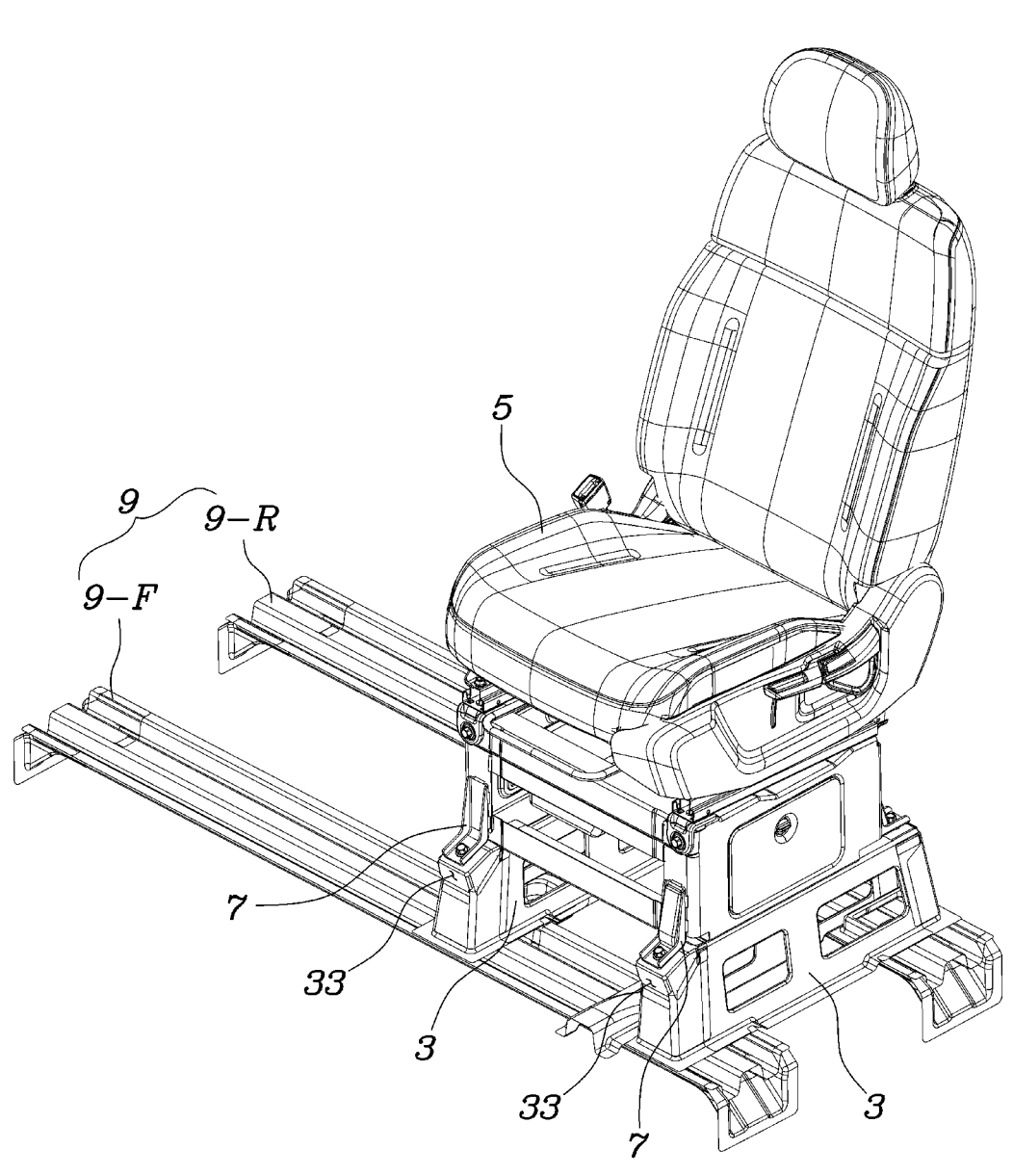
FIG. 3 is a view showing the components of FIG. 2 when seen from the front of a vehicle body.
Figure 4:
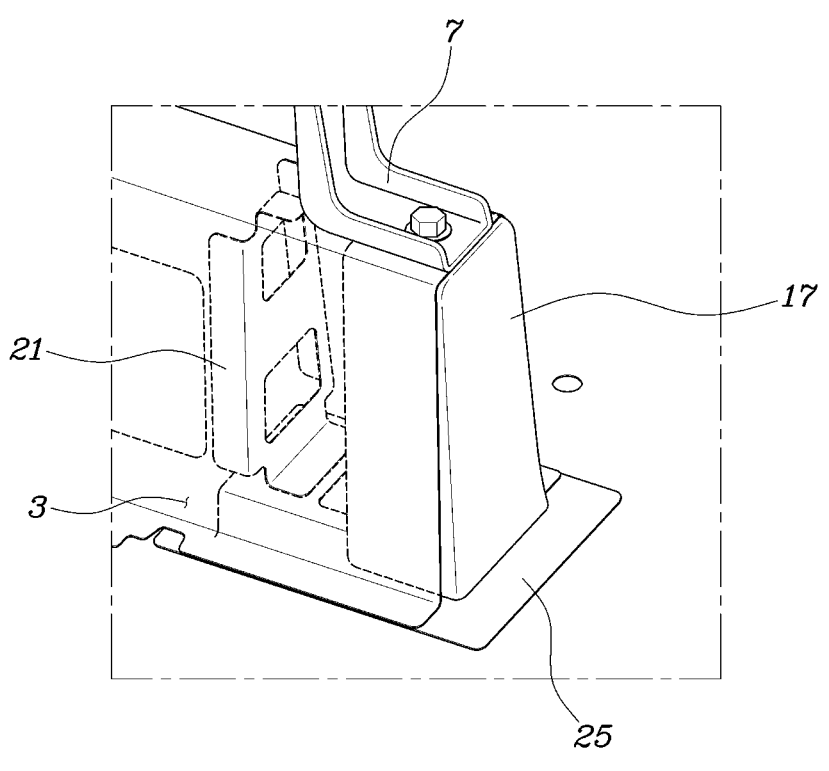
FIG. 4 is a detailed view showing portion IV of FIG. 2.
Figure 5:
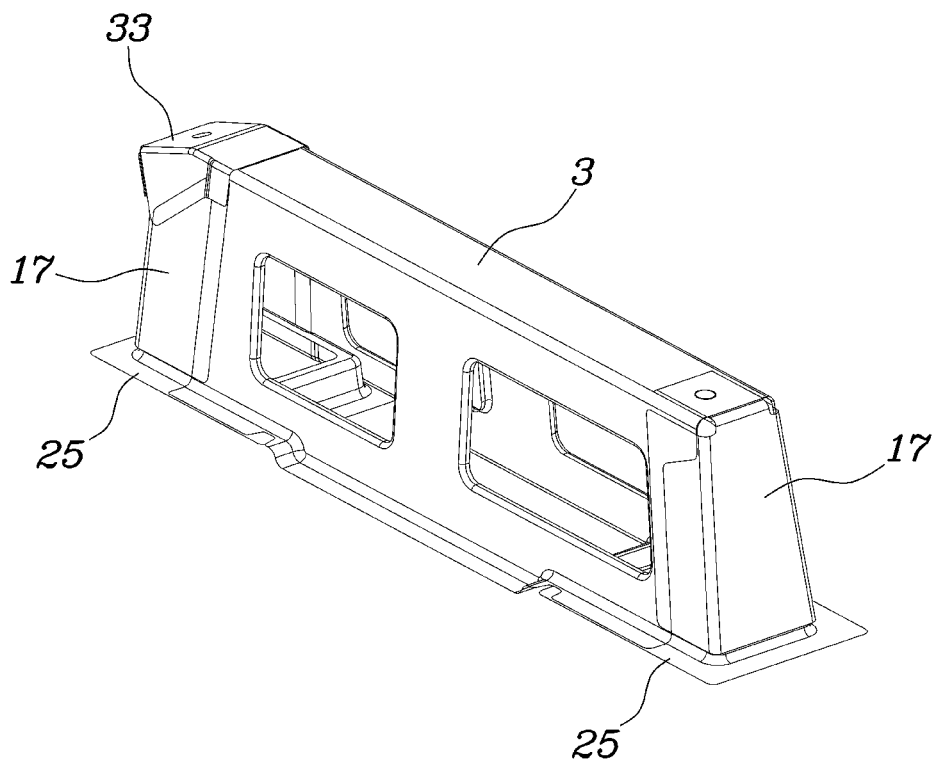
FIG. 5 is a view showing certain components of FIG. 4.
Figure 6:
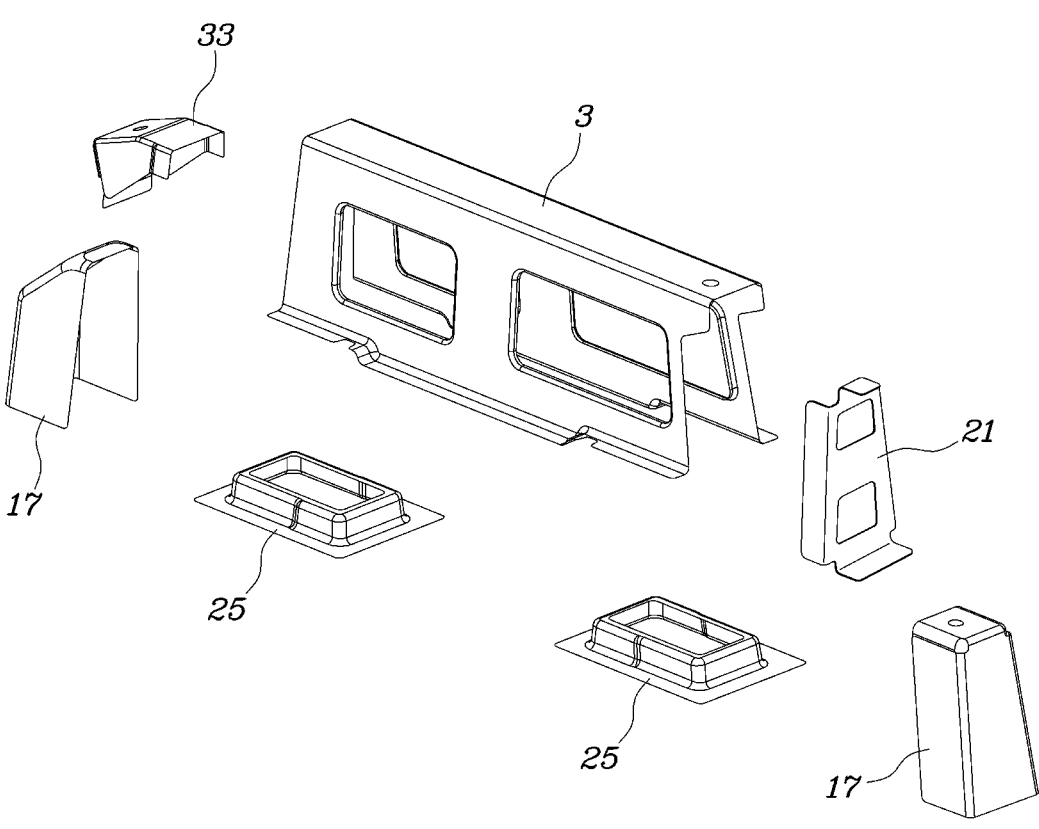
FIG. 6 is an exploded view showing the components of FIG. 5.

Hereafter, embodiments of the present disclosure will be described in detail with reference to the accompanying drawings and the same or similar components are given the same reference numerals regardless of the numbers of figures and are not repeatedly described.

Terms "module" and "unit" that are used for components in the following description are used only for the convenience of description without having discriminated meanings or functions.

In the following description, if it is decided that the detailed description of known technologies related to embodiments of the present disclosure makes the subject matter of the embodiments described herein unclear, the detailed description is omitted. Further, the accompanying drawings are provided only for easy understanding of embodiments disclosed in the specification, and the technical spirit disclosed in the specification is not limited by the accompanying drawings, and all changes, equivalents, and replacements should be understood as being included in the spirit and scope of the present disclosure.

Terms including ordinal numbers such as "first," "second," etc. may be used to describe various components, but the components are not to be construed as being limited to the terms. The terms are used only to distinguish one component from another component.

It is to be understood that when one element is referred to as being "connected to" or "coupled to" another element, it may be connected directly to or coupled directly to another element or it may be connected to or coupled to another element, having the other element intervening therebetween. On the other hand, it should to be understood that when one element is referred to as being "connected directly to" or "coupled directly to" another element, it may be connected to or coupled to another element without the other element intervening therebetween.

Singular forms are intended to include plural forms unless the context clearly indicates otherwise.

It will be further understood that the terms "comprise" or "have" used in this specification specify the presence of stated features, steps, operations, components, parts, or a combination thereof, but do not preclude the presence or addition of one or more other features, numerals, steps, operations, components, parts, or a combination thereof.

Referring to FIGS. 1 to 7, a driver's seat mounting structure of a vehicle according to an embodiment of the present disclosure includes a seat mounting support 3 that is installed to protrude from an upper side of a floor panel 1, a seat leg bracket 7 that is provided on a lower side of a seat 5 and is coupled to an upper side of the seat mounting support 3 to fix the seat 5 to the upper side of the seat mounting support 3, a seat cross member 9 that is provided on a lower side of the floor panel 1 to face the seat mounting support 3 with the floor panel 1 therebetween and is arranged long in a transverse direction of a vehicle body, and a battery passing bolt 13 that passes through a battery pack 11 disposed under the floor panel 1 and the seat cross member 9 to be coupled to the seat cross member 9.

Here, the seat 5 refers to a driver's seat.

That is, according to an embodiment of the present disclosure, the seat 5 is mounted on the floor panel 1 using the seat mounting support 3, the upwardly protruding seat mounting support 3 is mounted on the upper side of the floor panel 1, and the seat 5 is fixed to the upper side of the seat mounting support 3 using the seat leg bracket 7, thus defining a seating surface for a driver. Thus, although a dash panel 15 having a relatively large inclination is located in front of the seat 5, it is possible to secure a comfortable foot accommodation space in front of the driver sitting on the seat 5.

Further, the seat cross member 9 is coupled to the lower side of the seat mounting support 3 with the floor panel 1 therebetween, and the battery passing bolt 13 is fastened to the seat cross member 9, so a portion of the floor panel 1 on which the seat mounting support 3 is mounted forms an overlapping coupling structure of multiple parts and thereby strong rigidity can be secured.

The seat mounting support 3 is formed long in a front-rear direction of the vehicle body and is disposed to support a lower portion of either side of the seat 5. A seat mounting reinforcement 17 is provided on each of front and rear sides of the seat mounting support 3 to reinforce the rigidity of the seat mounting support 3.

The seat cross member 9 includes a front seat cross member 9-F that is installed on a lower side of the seat mounting reinforcement 17 provided on the front side of the seat mounting support 3 and a rear seat cross member 9-R that is installed on a lower side of the seat mounting reinforcement 17 provided on the rear side of the seat mounting support 3.

Therefore, the seat mounting support 3 forms a rectangular lattice structure together with the front seat cross member 9-F and the rear seat cross member 9-R with the floor panel 1 therebetween. Such a structure enables the seat mounting support 3 to secure basic structural rigidity capable of supporting the seat 5 with stronger rigidity.

Further, a seat mounting gusset 21 is provided above a portion to which the battery passing bolt 13 is coupled, thus defining a space 19 extending long in a vertical direction together with the seat mounting support 3 and the seat mounting reinforcement 17.

Therefore, a penetration part 23 provided in the battery pack 11 to install the battery passing bolt 13 therein and the space 19 are aligned in the vertical direction with the floor panel 1 therebetween, thus maximizing structural rigidity, and thereby improving NVH (noise, vibration, and harshness) characteristics of a mounting portion of the seat 5 and significantly improving durability.

In this embodiment, the space 19 is formed in the shape of a rectangular pillar by the seat mounting support 3, the seat mounting reinforcement 17, and the seat mounting gusset 21.

Further, a seat mounting foot bracket 25 is installed on the lower side of each of the seat mounting support 3, the seat mounting reinforcement 17, and the seat mounting gusset 21 defining the space 19. The seat mounting foot bracket 25 is provided to face the seat cross member 9 with the floor panel 1 therebetween.

The seat mounting foot bracket 25 is coupled to and is in surface contact with a lower end of an inside of the seat mounting support 3, a lower end of an inside of the seat mounting reinforcement 17, and a lower end of the seat mounting gusset 21.

Therefore, the seat mounting support 3, the seat mounting reinforcement 17, and the seat mounting gusset 21 form a more robust coupling structure on the upper side of the floor panel 1 due to the seat mounting foot bracket 25.

Figure 7:
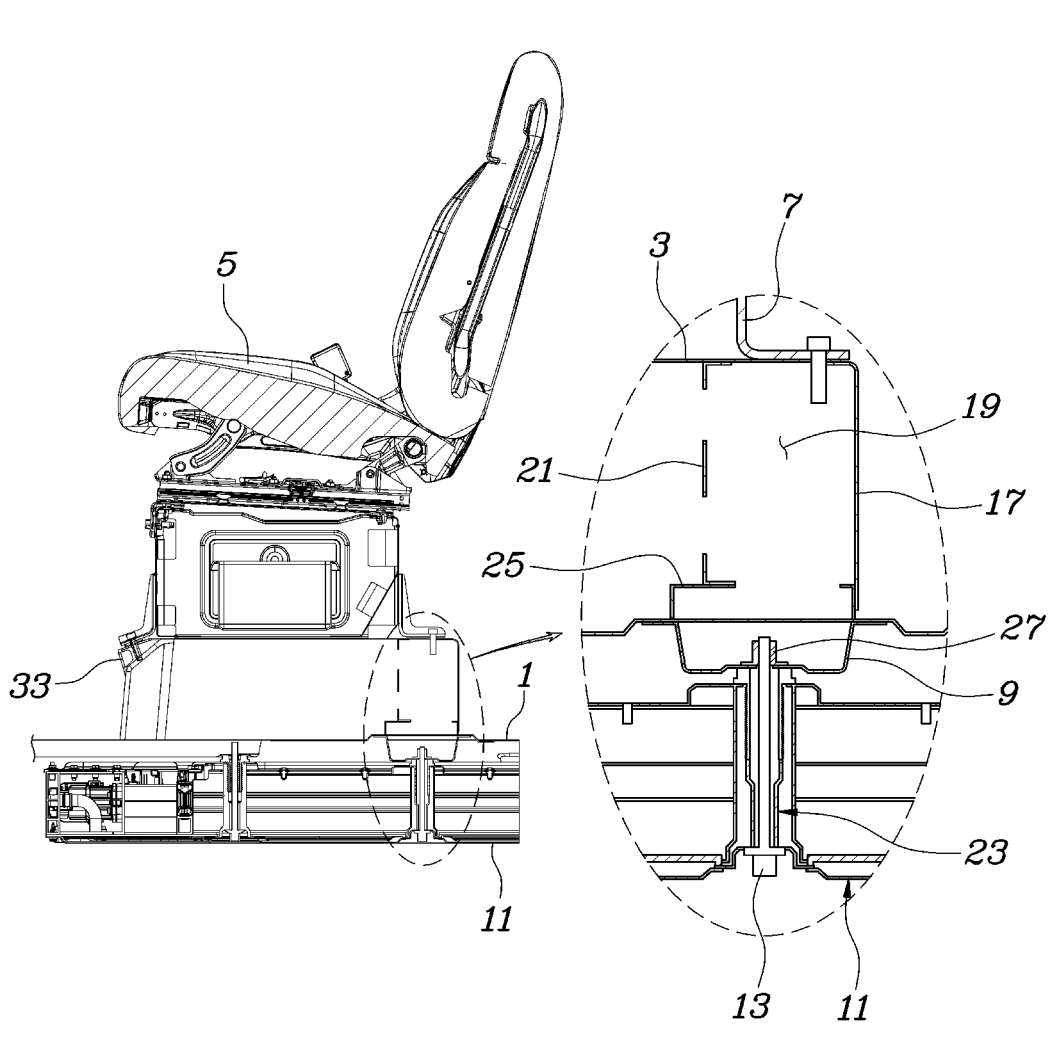
FIG. 7 is a sectional view taken along line VII-VII of FIG. 2.

In FIG. 7, the battery passing bolt 13 is configured to be fastened to a weld nut 27 provided on the seat cross member 9.

Figure 8:
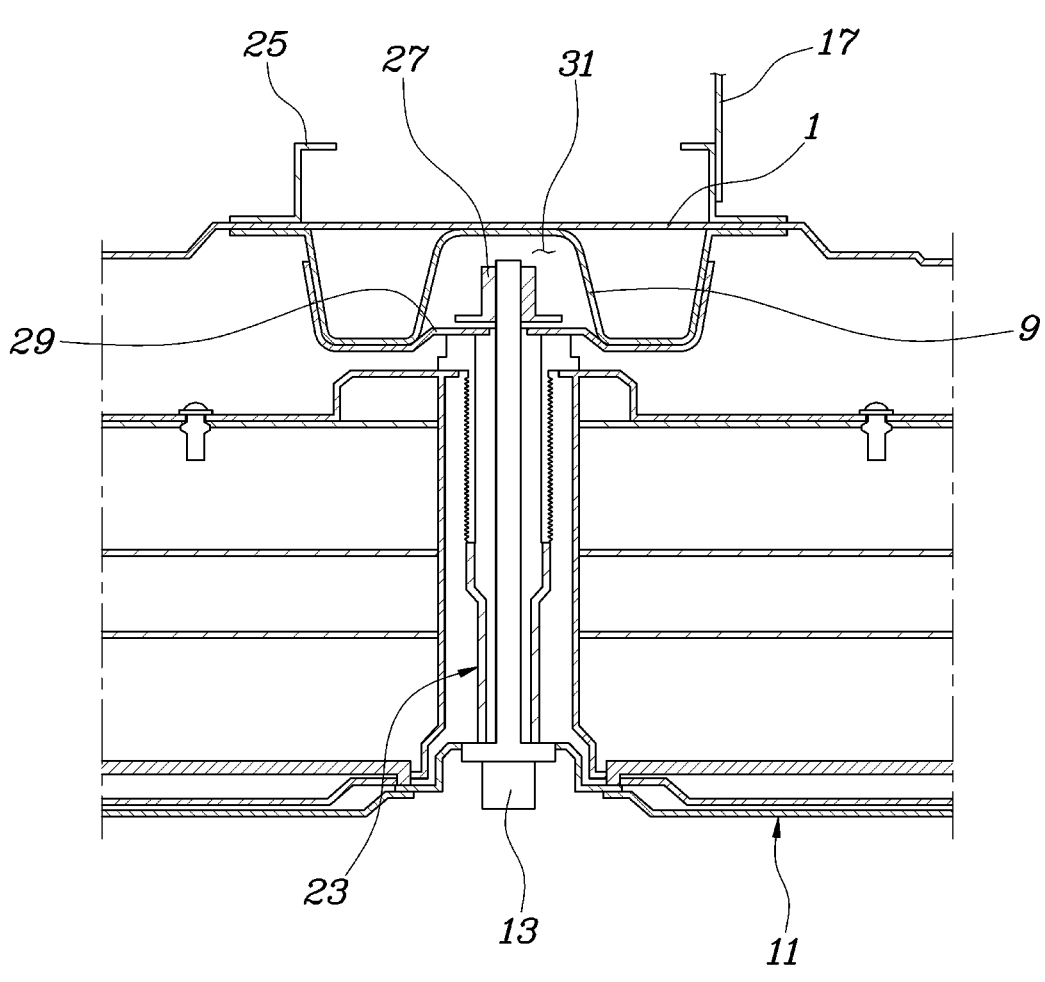
FIG. 8 is a view illustrating another embodiment of the present disclosure.

On the contrary, in another embodiment shown in FIG. 8, the battery passing bolt 13 is configured to be fastened to a weld nut 27 provided on a battery mounting bracket 29 that is further provided on the lower side of the seat cross member 9.

That is, the seat cross member 9 has a W-shaped cross-section, and the battery mounting bracket 29 is formed in the shape of a panel surrounding the lower side of the seat cross member 9. The weld nut 27 is coupled to the upper side of the battery mounting bracket 29 within a central recess 31 of the seat cross member 9. The battery passing bolt 13 passes through the battery mounting bracket 29 and then is fastened to the weld nut 27.

Such a configuration may provide a more robust mounting structure of the battery pack 11 compared to the embodiment of FIG. 7, and the rigidity of the seat cross member 9 may be increased by the battery mounting bracket 29, thus ultimately allowing the seat 5 located at an upper position to be more firmly supported.

On the other hand, a seat mounting bracket 33 to which the seat leg bracket 7 is coupled is provided on the upper side of the seat mounting reinforcement 17 that is provided on the front side of the seat mounting support 3 while surrounding a corner where the seat mounting support 3 and the seat mounting reinforcement 17 meet each other, thus further enhancing the rigidity of the front side of the seat mounting support 3 and allowing the seat 5 to be more robustly supported.

Although embodiments of the present disclosure were provided above in relation to specific embodiments shown in the drawings, it is apparent to those skilled in the art that embodiments of the present disclosure may be changed and modified in various ways without departing from the scope of the present disclosure, which is described in the following claims.

What is claimed is:

1. A seat mounting structure for a vehicle, the structure comprising:

a seat mounting support designed to protrude from an upper side of a floor panel;

a seat leg bracket provided on a lower side of a seat and coupled to an upper side of the seat mounting support to fix the seat to the upper side of the seat mounting support;

a seat cross member to be provided on a lower side of the floor panel to face the seat mounting support with the floor panel therebetween and arranged long in a transverse direction of a vehicle body;

a battery passing bolt configured to pass through a battery pack disposed under the floor panel and the seat cross member to be coupled to the seat cross member;

a first seat mounting reinforcement on a front side of the seat mounting support and a second seat mounting reinforcement on a rear side of the seat mounting support, the first seat mounting reinforcement and the second seat mounting reinforcement being configured to reinforce rigidity of the seat mounting support; and a seat mounting gusset provided above a portion to which the battery passing bolt is coupled to define a space extending long in a vertical direction together with the seat mounting support and the second seat mounting reinforcement.

2. The structure of claim 1, wherein the seat mounting support is formed long in a front-rear direction of the vehicle body.

3. The structure of claim 2, wherein the seat cross member comprises:

a front seat cross member installed on a lower side of the first seat mounting reinforcement provided on the front side of the seat mounting support; and a rear seat cross member installed on a lower side of the second seat mounting reinforcement provided on the rear side of the seat mounting support.

4. The structure of claim 3, wherein the seat mounting support is provided long in a front-rear direction, is disposed to support a lower portion of either side of the seat, and defines a rectangular lattice structure together with the front seat cross member and the rear seat cross member with the floor panel therebetween.

5. The structure of claim 1, wherein the space has a shape of a rectangular pillar by the seat mounting support, the second seat mounting reinforcement, and the seat mounting gusset.

6. The structure of claim 1, further comprising seat mounting foot brackets installed on a lower side of each of the seat mounting support, the first and the second seat mounting reinforcements, and the seat mounting gusset defining the space, wherein the seat mounting foot brackets face the seat cross member with the floor panel therebetween.

7. The structure of claim 6, wherein the seat mounting foot brackets are coupled to and are in surface contact with a lower end of an inside of the seat mounting support, a lower end of an inside of the first and the second seat mounting reinforcements, and a lower end of the seat mounting gusset.

8. The structure of claim 1, further comprising a weld nut on the seat cross member, wherein the battery passing bolt is fastened to the weld nut.

9. The structure of claim 1, further comprising:

a battery mounting bracket on a lower side of the seat cross member; and a weld nut on the battery mounting bracket, wherein the battery passing bolt is fastened to the weld nut.

10. The structure of claim 9, wherein:

the seat cross member has a W-shaped cross-section;

the battery mounting bracket has a shape of a panel surrounding the lower side of the seat cross member;

the weld nut is coupled to an upper side of the battery mounting bracket within a central recess of the seat cross member; and the battery passing bolt is fastened to the weld nut after passing through the battery mounting bracket.

11. The structure of claim 1, further comprising a seat mounting bracket on an upper side of the first seat mounting reinforcement on the front side of the seat mounting support and surrounding a corner where the seat mounting support and the first seat mounting reinforcement meet each other, wherein the seat leg bracket is coupled to the seat mounting bracket.

12. A vehicle comprising:

a vehicle body comprising a floor panel;

a battery pack disposed under the floor panel;

a seat;

a seat mounting support protruding from an upper side of the floor panel;

a seat leg bracket provided on a lower side of the seat and coupled to an upper side of the seat mounting support to fix the seat to the upper side of the seat mounting support;

a seat cross member provided on a lower side of the floor panel to face the seat mounting support with the floor panel therebetween and arranged long in a transverse direction of the vehicle body;

a battery passing bolt passing through the battery pack and the seat cross member to be coupled to the seat cross member;

a first seat mounting reinforcement on a front side of the seat mounting support and a second seat mounting reinforcement on a rear side of the seat mounting support; and a seat mounting gusset above a portion to which the battery passing bolt is coupled to define a space extending long in a vertical direction together with the seat mounting support and the second seat mounting reinforcement.

13. The vehicle of claim 12, wherein the seat cross member comprises:

a front seat cross member installed on a lower side of the first seat mounting reinforcement; and a rear seat cross member installed on a lower side of the second seat mounting reinforcement.

14. The vehicle of claim 13, wherein the space has a shape of a rectangular pillar by the seat mounting support, the second seat mounting reinforcement, and the seat mounting gusset.

15. The vehicle of claim 12, further comprising seat mounting foot brackets installed on a lower side of each of the seat mounting support, the first and the second seat mounting reinforcements, and the seat mounting gusset defining the space, wherein the seat mounting foot brackets face the seat cross member with the floor panel therebetween.

16. The vehicle of claim 12, further comprising:

a battery mounting bracket having a shape of a panel and surrounding a lower side of the seat cross member, wherein the seat cross member has a W-shaped cross-section; and a weld nut coupled to an upper side of the battery mounting bracket within a central recess of the seat cross member, wherein the battery passing bolt is fastened to the weld nut after passing through the battery mounting bracket.

17. The vehicle of claim 12, further comprising seat mounting foot brackets installed on a lower side of each of the seat mounting support, the first and the second seat mounting reinforcements, and the seat mounting gusset, wherein the seat mounting foot brackets are coupled to and are in surface contact with a lower end of an inside of the seat mounting support, a lower end of an inside of the first and the second seat mounting reinforcements, and a lower end of the seat mounting gusset.

18. A seat mounting structure for a vehicle, the structure comprising:

a seat mounting support designed to protrude from an upper side of a floor panel and formed long in a front-rear direction of a vehicle body;

a seat leg bracket provided on a lower side of a seat and coupled to an upper side of the seat mounting support to fix the seat to the upper side of the seat mounting support;

a front seat cross member and a rear seat cross member provided on a lower side of the floor panel to face the seat mounting support with the floor panel therebetween and arranged long in a transverse direction of the vehicle body;

a first seat mounting reinforcement on a front side of the seat mounting support and a second seat mounting reinforcement on a rear side of the seat mounting support, wherein the seat mounting support defines a rectangular lattice structure together with the first seat mounting reinforcement and the second seat mounting reinforcement with the floor panel therebetween;

a battery passing bolt configured to pass through a battery pack disposed under the floor panel and the rear seat cross member to be coupled to the rear seat cross member; and a seat mounting gusset provided above a portion to which the battery passing bolt is coupled to define a space extending long in a vertical direction together with the seat mounting support and the second seat mounting reinforcement.

19. The structure of claim 18, further comprising seat mounting foot brackets installed on a lower side of each of the seat mounting support, the first and the second seat mounting reinforcements, and the seat mounting gusset, wherein the seat mounting foot brackets are coupled to and are in surface contact with a lower end of an inside of the seat mounting support, a lower end of an inside of the first and the second seat mounting reinforcements, and a lower end of the seat mounting gusset.

20. The structure of claim 18, further comprising a battery mounting bracket having a shape of a panel surrounding a lower side of the rear seat cross member, wherein the rear seat cross member has a W-shaped cross-section; and a weld nut coupled to an upper side of the battery mounting bracket within a central recess of the rear seat cross member, wherein the battery passing bolt is fastened to the weld nut after passing through the battery mounting bracket.

* * * * *